United States Patent [19]
Sasaki et al.

[11] Patent Number: 6,079,948
[45] Date of Patent: Jun. 27, 2000

[54] BLADE FOR AXIAL FLUID MACHINE HAVING PROJECTING PORTION AT THE TIP AND ROOT OF THE BLADE

[75] Inventors: Takashi Sasaki; Kenichi Okuno; Sakae Kawasaki, all of Yokohama, Japan

[73] Assignee: Kabushiki Kaisha Toshiba, Kawasaki, Japan

[21] Appl. No.: 08/941,032

[22] Filed: Sep. 30, 1997

[30] Foreign Application Priority Data

Sep. 30, 1996 [JP] Japan ................................. 8-259681

[51] Int. Cl.$^7$ .................................................... F04D 29/54
[52] U.S. Cl. .......................... 416/237; 415/191; 415/192; 415/208.1; 415/914; 416/223 A; 416/223 R; 416/228; 416/235
[58] Field of Search .................................. 415/191, 192, 415/181, 208.1, 208.2, 914; 416/223 R, 223 A, 228, 235, 237, 243 A, 243 R, 228 A

[56] References Cited

U.S. PATENT DOCUMENTS

| | | | |
|---|---|---|---|
| 2,355,413 | 8/1944 | Bloomberg | 416/228 |
| 2,795,373 | 6/1957 | Hewson | 138/148 |
| 2,801,790 | 8/1957 | Doll, Jr. | 415/914 |
| 4,696,621 | 9/1987 | Hamblett et al. | 416/223 A |
| 5,088,892 | 2/1992 | Weingold et al. | 415/914 |

FOREIGN PATENT DOCUMENTS

| | | |
|---|---|---|
| 0 441 097 | 8/1991 | European Pat. Off. . |
| 0 661 413 | 7/1995 | European Pat. Off. . |
| 560 687 | 9/1932 | Germany . |
| 2 034 890 | 2/1971 | Germany . |
| 0069405 | 5/1981 | Japan .................. 416/223 A |
| 56-19446 | 5/1981 | Japan . |
| 0115500 | 7/1984 | Japan .................. 416/223 A |

OTHER PUBLICATIONS

D.L. Tweedt, et al., The American Society of Mechanical Engineers, 86–GT–197, pp. 1–10, Jun. 8–12, 1986, "Stator Endwall Leading–Edge Sweep and Hub Shroud Influence on Compressor Performance".

Electric Power Research Institute, pp. 4–9 to 4–11, Dec. 1986, "High–Efficiency Axial Compressor".

Patent Abstracts of Japan, vol. 008, No. 238 (M–335), Oct. 31, 1984, JP 59 115500, Jul. 3, 1984.

*Primary Examiner*—Edward K. Look
*Assistant Examiner*—Matthew T. Shanley
*Attorney, Agent, or Firm*—Oblon, Spivak, McClelland, Maier & Neustadt, P.C.

[57] ABSTRACT

A blade for an axial fluid machine comprises an effective blade portion having a root portion and a tip portion and projecting blade portions. The projecting blade portions are defined by axis reference lines extending to an upstream side with respect to a fluid flow from at least one of the root portion and the tip portion of the effective blade portion and by axes obliquely extending from ends of the axis reference lines toward a leading edge of the effective blade portion. The projecting blade portions are formed continuously to and integrally with the leading edge of the effective blade portion so that the effective blade portion and the projecting blade portions have substantially the same maximum blade thickness.

6 Claims, 17 Drawing Sheets

BLADE FOR AXIAL FLUID MACHINE HAVING PROJECTING PORTION AT THE TIP AND ROOT OF THE BLADE

BACKGROUND OF THE INVENTION

1. Field of the Invention

The present invention relates to a blade for an axial fluid machine, and more specifically, to blades for an axial fluid machine for lowering a secondary flow loss which is caused when a blade cascade disposed along the axial direction of a rotational shaft passes through a working fluid to thereby improve the efficiency the blade cascade.

2. Discussion of the Background

In general, although there are various types of prime movers such as an axial type, a radial flow type, a centrifugal type, a volume type and the like in a fluid machine, since a high output can be obtained from the axial type prime mover among them, it has been used as an ultra-large prime mover for an air compressor, a gas turbine, a steam turbine and the like which are used with air craft and power generation plants.

As shown in FIG. 14, an axial fluid machine, for example, an air compressor is arranged such that it is accommodated in a casing 1, and compressor stages 4 each composed of the combination of a stationary blade 2 and a moving blade 3 are disposed along the axial direction of a rotational shaft 5. Atmospheric air 7 sucked from an inlet 6 is compressed by the moving blade 3, high pressure air passing a first compressor stage is then guided to the next compressor stage 4 through the moving blade 3, and the resulting high pressure air 8, which has been compressed to a predetermined pressure, is supplied to a gas turbine, not shown, from an outlet 9.

Further, as shown in FIG. 15, the axial fluid machine, for example, a steam turbine, is arranged such that it is accommodated in a casing 10 and has turbine stages 17 each composed of the combination of a stationary blade 13, which is clamped between a diaphragm outer ring 11 and a diaphragm inner ring 12, and a moving blade 14 planted on the disk 16 of a rotational shaft 15. The turbine stages 17 are disposed along the axial direction of a rotational shaft 15, stream 18 is expanded by the stationary blades 14 and the expanding force thereof is applied to the moving blades 14 so as to rotate the same to thereby utilize the rotational force thereof. Further, steam leaking at a time when the stream 18 passes through the turbine stages 17 is sealed by the labyrinths 19 planted on the diaphragm inner ring 12.

Incidentally, when the high pressure air 8 passes through the stationary blades 2 and the moving blade 3 in the axial air compressor or when the stream 18 passes through the moving blade and the stationary blades 13 in the axial steam turbine, various losses are caused, which result in a reason for lowering a blade cascade (train) efficiency as a blade cascade loss.

The blade cascade loss includes a profile loss caused by the shape of a profile itself, a clearance leakage loss caused by the clearance between a blade tip and a flow passage wall, and an endwall loss caused by the existence of the inner peripheral surface and the outer peripheral wall of a flow passage. Among them, the endwall loss is a large factor in the reduction of the blade cascade efficiency.

The wall surface loss is mainly caused by a swirl resulting from a secondary flow generated in the blade cascade and the boundary layer exfoliation of the flow passage wall caused by the swirl. Typical examples of the swirl resulting from the secondary flow and the boundary layer exfoliation are common to the axial air compressor and the axial stem turbine, and it is known that the secondary flow is generated by the behavior of a main stream passing between the blade cascade (although air is a working fluid in the air compressor and stream is the working fluid in the stream turbine, each of these working fluids is referred to as the main stream in the following description).

The main stream flows along a blade profile on the intermediate portion side of a blade in the lengthwise direction thereof when it passes between the blade cascade, whereas the secondary stream is a stream which flows in a direction which intersects the main stream flowing on the side of an intermediate blade height portion on a blade tip side and a blade root side and is generated by a pressure difference between a blade and an adjacent blade.

When the main stream intersects the secondary stream, it is accompanied by a swirl which is generated as shown in FIG. 16 and the swirl will be generated in a short time. That is, when main streams $20a$, $20b$ accompanied by inlet boundary layers $20a_1$, $20b_1$ flow into the flow passages $22a$, $22b$ between blades $21a$, $21b$, they collide against leading edges $23a$, $23b$ and then generate swirls $24a$, $24b$.

The swirls $24a$, $24b$ are divided into concave side horseshoe-shaped swirls $24a_1$, $24b_1$ and convex side horseshoe-shaped swirls $24a_2$, $24b_2$. When the convex side horseshoe-shaped swirls $24a_2$, $24b_2$ flow along the convex sides $25a$, $25b$ of the blades $21a$, $21b$ which are made to a negative pressure, they flow to trailing edges $26a$, $26b$ while gradually growing by rolling the boundary layers of the flow passages $22a$, $22b$.

On the other hand, when the concave side horseshoe-shaped swirls $24a_1$, $24b_1$ flow toward the convex sides $25b$, $25c$ of the adjacent blade $21b$, $21c$ together with a secondary stream due to the pressure difference between the concave sides $27a$, $27b$ of the blades $21a$, $21b$ which are under a positive pressure and the convex sides $25b$, $25c$ of the adjacent blades $21b$, $21c$ which under a negative pressure, they are greatly enlarged by rolling the boundary layers of the flow passages $22a$, $22b$, and then the swirls $24a_1$ and $24a_2$ merge with the convex side horseshoe-shaped swirls $24a_2$, $24b_2$ as flow passage swirls $24a_3$, $24b_3$.

As described above, it is to be understood that, as a secondary stream swirl as a whole, the swirls $24a$, $24b$, which are generated by the collision of the main streams $20a$, $20b$ against the leading edges $23a$, $23b$ of the blades $21a$, $21b$, are divided into the concave side horseshoe-shaped swirls $24a_1$, $24b_1$ and the convex side horseshoe-shaped swirls $24a_2$, $24b_2$, that the concave side horseshoe-shaped swirls $24a_1$, $24b_1$ are greatly enlarged and are added to the flow passage swirls $24a_3$, $24b_3$ and that the convex side horseshoe-shaped swirls $24a_2$, $24b_2$ are greatly enlarged while they flow along the convex sides $25a$, $25b$.

The secondary stream swirl exhibits the flow lines of the main streams $20a$, $20b$ which pass in the vicinity of the wall surfaces of the flow passages $22a$, $22b$ and is a main reason why the blade cascade efficiency of the blades $21a$, $21b$ is lowered. Accordingly, it is necessary to suppress the secondary stream swirl.

For example, Japanese Patent Publication No. 56-19446 discloses a method of suppressing the secondary stream swirl. As shown in FIG. 17, the technology of this publication shows theoretical arrangement in which projecting blade portions 30 are formed at the leading edge 29 of an effective blade portion 28 over distances $1a$ from flow passage walls 31 and the lateral cross-sectional shape of each of the projecting blade portions 30 is formed such that a projecting blade portion convex side 32a is caused to coincide with an effective blade portion concave side 32b and a projecting blade portion concave side 33a is bulged outward more than the effective blade portion convex side 33b as shown in FIG. 18. Further, the intersection point S10 of the projecting blade portion 30 with the flow passage wall 31, the intersection point S20 of the projecting blade portion 30 with the effective blade portion 28 and the projecting point S30 of an intersection point S20 to the flow passage wall 31 shown in FIG. 17 are caused to correspond to the points S10, S20 and S30 shown in FIG. 16, respectively.

In such technology, the convex side horseshoe-shaped swirl of the secondary stream swirl is suppressed to a low level by making the pressure of the effective blade portion convex side 33b higher than that of the projecting blade portion concave side 33a along a blade chord c as shown in FIG. 19 in such a manner that the projecting blade portions 30, 30 are formed toward the leading edge 29 of the effective blade portion 28 toward the flow passage walls 31, 31 sides and the code length of the projecting blade portions 30, 30 is increased with respect to the chord length of the effective blade portion. That is, a pressing force is applied to the projecting blade portion convex side 33a from the effective blade portion convex side 33b to thereby suppress the growth of the convex side horseshoe-shaped swirl.

As described above, the prior art shown in FIG. 17 has an excellent advantage that the growth of the convex side horseshoe-shaped swirl is suppressed to the low level. However, since the pressure difference between the effective blade portion concave side 32b and projecting blade portion concave side 32a, and the projecting blade portion convex side 33b is made more higher than a conventional pressure difference shown in FIG. 19, the growth of a flow passage swirl from the concave side of a blade to the convex side of the other adjacent blade is more greatly promoted. As a result, the prior art shown in FIG. 17 provides a disadvantage that a flow passage swirl which will be greatly grown from the concave side horseshoe-shaped swirl in a short time cannot be suppressed and the blade cascade efficiency cannot be increased.

SUMMARY OF THE INVENTION

An object of the present invention is to substantially eliminate defects or drawbacks encountered in the prior art mentioned above and to provide blades for an axial fluid machine capable of greatly improving a blade cascade efficiency by suppressing the growth of a convex side horseshoe-shaped swirl and a flow passage swirl to a low level.

This and other objects can be achieved, in one aspect of the present invention, by providing a blade for an axial fluid machine which comprises an effective blade portion having a root portion and a tip portion and projecting blade portions, wherein the projecting blade portions are defined by axis reference lines extending to an upstream side with respect to a fluid flow from at least one of the root portion, and the tip portion of the effective blade portion and axes obliquely extending from ends of the axis reference lines toward a front edge of the effective blade portion and the projecting blade portions are formed continuously to and integrally with the front edge of the effective blade portion so that the effective blade portion and the projecting blade portions have substantially the same maximum blade thickness.

In preferred examples of this aspect, the axes obliquely extending toward the front edge of the effective blade portion have an inclination in a range of 15° to 45° with respect to the front edge of the effective blade portion. The axes obliquely extending toward the front edge of the effective blade portion has a height set to a range of ⅙–⅖ with respect to an entire blade length of the effective blade portion.

In another aspect of the present invention, there is provided a blade for an axial fluid machine which comprises an effective blade portion having a root portion and a tip portion and projecting blade portions including first and second groups thereof in arrangement, wherein the first group of the projecting blade portions includes projecting blade portions defined by first axis reference lines extending to an upstream side with respect to a fluid flow from at least one of the root portion and the tip portion of the effective blade portion and first axes obliquely extending from ends of the first axis reference lines toward a front edge of the effective blade portion, the projection blade portions of the first group being formed continuously to and integrally with the front edge of the effective blade portion, and the second group of the projecting blade portions includes projecting blade portions defined by second axis reference lines extending to a downstream side with respect to a fluid flow from at least one of the root portion and the tip portion of the effective blade portion and second axes obliquely extending from ends of the second axis reference lines toward a rear edge of the effective blade portion, the projecting blade portions of the second group being formed continuously to and integrally with the rear edge of the effective blade portion, and wherein the effective blade portion and the projecting blade portions of first and second groups have substantially the same maximum blade thickness.

In preferred examples of this aspect, the axes obliquely extending toward the rear edge of the effective blade portion have an inclination in a range of 15° to 45° with respect to the rear edge of the effective blade portion. The axes obliquely extending toward the rear edge of the effective blade portion has a height set to a range of ⅙–⅖ with respect to an entire blade length of the effective blade portion.

In a further aspect of the present invention, there is provided a blade for an axial fluid machine including an effective blade portion, wherein the effective blade portion is divided into a root blade portion, an intermediate blade portion and a tip blade portion which are formed continuously and integrally with each other and wherein an axis passing through a center of cross section of the root blade portion and an axis passing through a center of cross section of the chip blade portion are obliquely extended toward an upstream side with respect to an axis passing through a center of cross section of the intermediate blade portion, and the root blade portion and the tip portion have a maximum blade thickness substantially the same as that of the intermediate blade portion.

In preferred examples of this aspect, the axis passing through the center of the cross section of the root blade portion and the axis passing through the center of cross section of the tip blade portion have inclinations in a range of 15° to 45° with respect to the axis passing through the center of cross section of the intermediate blade portion. A height of the axis passing through the center of the cross section of the root blade portion and a height of the axis passing through the center of cross section of the tip blade portion are set respectively to a range of ⅙–⅖ with respect to an entire blade length of the effective blade portion.

According to the characteristic features of the present invention described above, since the blades for the axial fluid machine are arranged such that the projecting blade portions, which are formed continuously to and integrally with the front edge of the effective blade portion, are formed to at least one of the root portion side and the chip portion side, the pressing forces are generated from the center of the effective blade portion toward at least one of the root portion, and the tip portion. The maximum blade thickness of the effective blade portion is also caused to coincide with the maximum blade thickness of the projecting blade portions and the pressure difference between the concave side of one blade and the convex side of the other adjacent blade is suppressed to a low level. Accordingly, the convex side horseshoe-shaped swirl and the flow passage swirl can be suppressed, whereby the blades for the axial fluid machine having a blade cascade efficiency higher than a conventional blade train efficiency can be realized.

Furthermore, according to the present invention, the blades for the axial fluid machine are arranged such that the projecting blade portions, which are formed continuously to and integrally with the front edge and the rear edge of the effective blade portion, are formed to at least one of the root portion side and the tip portion side, and the double pressing forces are generated from the center of the effective blade portion toward the root portion side and the tip portion side of the front edge and the root portion side and the tip portion side of the rear edge, respectively, Therefore, the convex side horseshoe-shaped swirl and the flow passage swirl can reliably be suppressed.

Still furthermore, according to the present invention, the blades for the axial fluid machine are arranged such that the effective blade portion is divided into the root blade portion, the intermediate blade portion and the tip blade portion. The root blade portion and the tip blade portion are continuously outwardly from the front edge of the intermediate blade portion integrally therewith, respectively. The pressing forces are generated from the intermediate blade portion to the root portion of the root blade portion and the tip portion of the tip blade portion. The maximum blade thickness of the intermediate blade portion is also caused to coincide with the maximum blade thickness of the root blade portion and the tip blade portion. The pressure difference between the concave side of one blade and the convex side of the other adjacent blade is suppressed to a low level. Accordingly, the convex side horseshoe-shaped swirl and the flow passage swirl can be suppressed.

The nature and further characteristic features of the present invention will be made more clear from the following descriptions made with reference to the accompanying drawings.

DESCRIPTION OF THE PREFERRED EMBODIMENTS

An embodiment of blades for an axial fluid machine according to the present invention will be described with reference to drawings.

Figure 1:
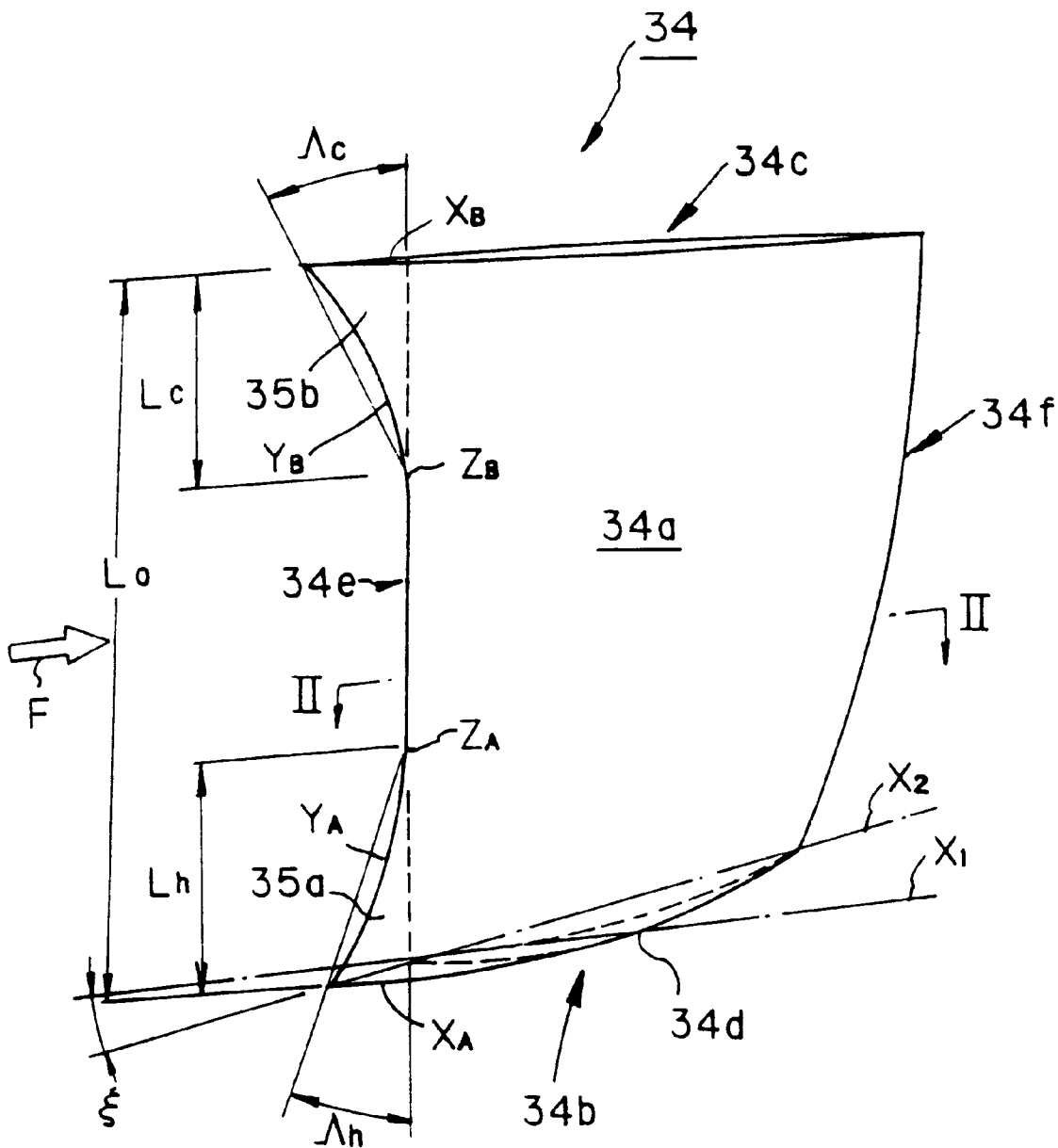
FIG. 1 is a perspective view schematically showing a first embodiment of a blade for an axial fluid machine according to the present invention.

FIG. 1 is a perspective view schematically showing a first embodiment in which blades for the axial fluid machine according to the present invention are applicable to an axial air compressor or an axial stream turbine. The profile shown in FIG. 1 is an example of the blades for the axial air compressor.

A blade 34 is formed to a profile in such a manner that it advance toward a main stream F along a stagger line $X_2$ (a line connecting a blade leading edge to a blade trailing edge) which is displaced at a stagger angle (staggering angle E) with respect to a rotational shaft direction line $X_1$ and reference blade elements 34d shown by virtual broken lines are stacked from a root portion 34b (blade root) toward a tip 34c (blade tip portion).

Further, the blade 34 includes an effective blade portion 34a obtained by stacking the reference blade elements 34d on the stagger line $X_2$ and changing the angle of the stagger line $X_2$ in a radial direction (blade lengthwise direction) and projecting blade portions 35a, 35b are formed integrally as portions of the effective blade portion 34a.

The projecting blade portions 35a, 35b are formed by axis reference lines $X_A$, $X_B$ which extend from the root portion 34b and the tip portion 34c of the effective blade portion 34a toward the main stream F side and axes $Y_A$, $Y_B$ having arc-shaped curved surfaces which are connected from ends of the axis reference lines $X_A$, $X_B$ to the leading edge 34e of the effective blade portion 34a.

Further, the projecting blade portions 35a, 35b are connected by forming the intersection points $Z_A$, $Z_B$ of the axes $Y_A$, $Y_B$ with the leading edge 34e of the effective blade portion 34a to a fillet shape (arc having a small curvature).

Figure 2:
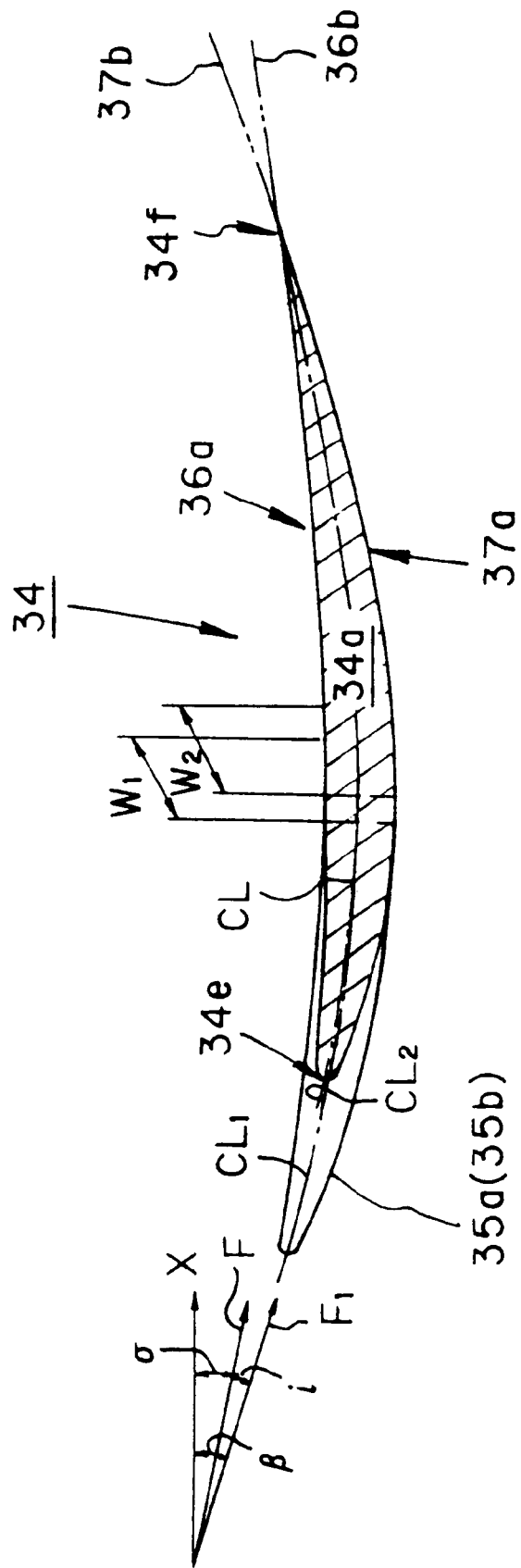
FIG. 2 is a sectional view taken along line II—II of FIG. 1.

Further, as shown in FIG. 2, the lateral (cross) sections of the projecting blade portions 35a, 35b which bulge continuously from the leading edge 34e of the effective blade portion 34a integrally therewith and the lateral (cross) section of only the effective blade portion 34a are formed such that they coincide with each other at the portion of the maximum blade thickness $W_2$ of, for example, the effective blade portion 34a by displacing the camber lines $CL_1$ of the projecting blade portions 35a, 35b from the camber line $CL_2$ of the effective blade portion 34a for making the inlet angle of the main stream F equal to each of the projecting blade portions 35a, 35b and the effective blade portion 34a.

As a result, the lateral sectional shapes of the projecting blade portions 35a, 35b and the effective blade portion 34a permit the contour line 36b of a concave side 36a to coincide with the contour line 37b of a convex side 37a toward a trailing edge 34f.

On the other hand, the axes $Y_A$, $Y_B$ of the projecting blade portions 35a, 35b are formed so as to be displaced by the inclinations $\wedge_h$, $\wedge_c$ thereof with respect to the leading edge 34e of the effective blade portion 34a. Further, the inclined axes $Y_A$, $Y_B$ of the projecting blade portions 35a, 35b are formed so that they have heights $L_n$, $L_c$ with respect to the entire blade length $L_o$ of the effective blade portion 34a, respectively.

The inclinations $\wedge_h$, $\wedge_c$ of the axes $Y_A$, $Y_B$ are set to the range of the following expression.

$$15° \leq \wedge_h, \wedge_c \leq 45°$$ [Expression 1]

The respective ranges of the inclinations $\wedge_h$, $\wedge_c$ of the axes $Y_A$, $Y_B$ are set sufficiently by taking the stall of the main stream F into consideration.

In general, although it is ideal to cause the main stream F to coincide with the blade inlet line $F_1$ (tangential lines of the camber lines $CL_1$, $CL_2$) of a blade inlet angle with respect to the coordinate axis X as shown in FIG. 2, actually, it often flows into a blade cascade or train at a flow angle σ with respect to the coordinate axis X. In this case, the difference between the blade inlet angle β and the flow angle σ is called an incidence i (suppressing angle), and it is said as a positive stall that the incidence i causes a stall toward the concave side 36a.

Whether the main stream F causes the positive stall or not solely depends on whether the incidence i is large or a small. As a result, the incidence i, more directly, the flow angle σ, is preliminarily determined by an experiment and when the flow angle σ determined by the experiment is within the range of a positive stall margin from the intersect point M of the minimum value ω min of blade cascade loss characteristics L to the intersect point N of a blade cascade loss value 2 ω min as shown in FIG. 4, the danger of the positive stall can be avoided.

Figure 4:
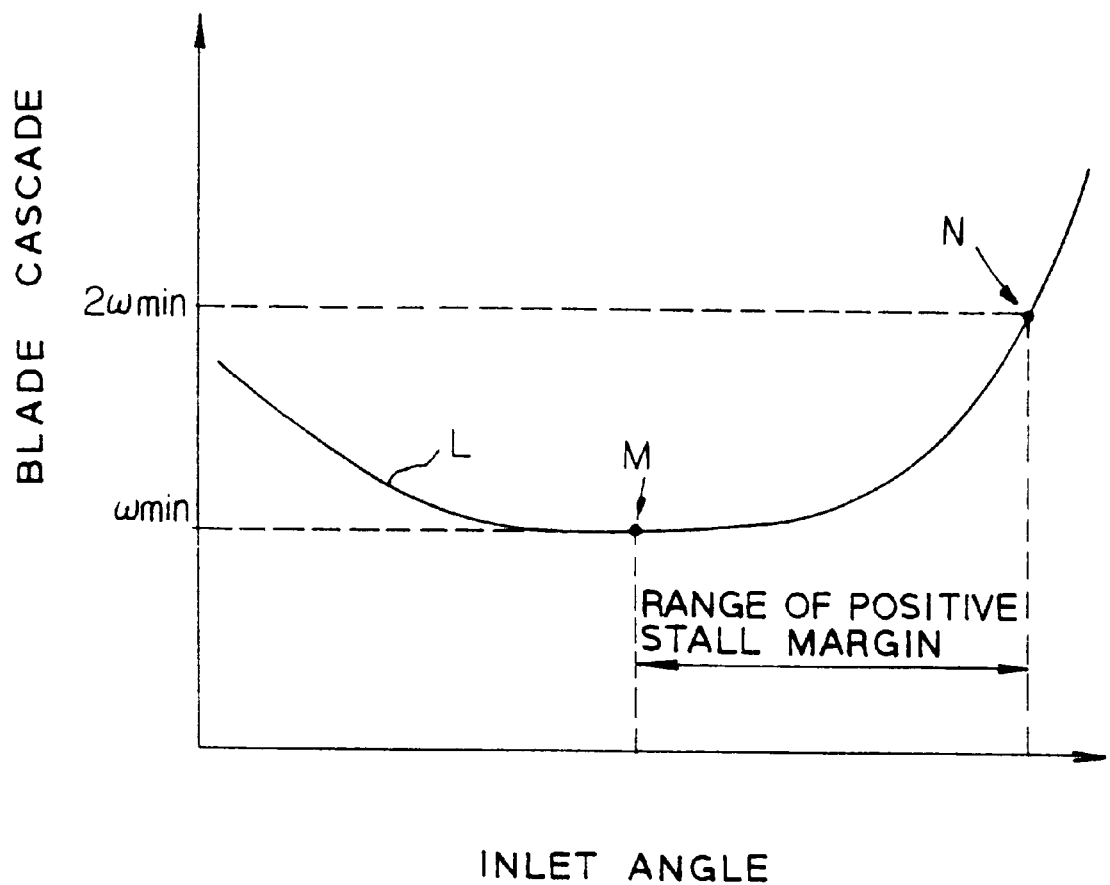
FIG. 4 is a view explaining that the inlet angle of the blade for the axial fluid machine according to the present invention is within the range of a positive stall margin range so as not to cause a stall.

As described above, the inclinations h, c of the axes $Y_A$, $Y_B$ are set within the range of 15°–45° respectively so that they fall within the range of the positive stall margin shown in FIG. 4 in order to securely avoid the danger that the main stream F stalls. Therefore, if they deviate from the range, there is a possibility of causing a stall.

Further, the heights $L_n$, $L_c$ of the axes $Y_A$, $Y_B$ are set within the range of the following expression with respect to the entire blade length $L_o$ of the effective blade portion 34a.

$$\frac{1}{6} = L_n/L_o, L_c/L_o \geq \frac{2}{6}$$ [Expression 2]

The expression is set in relation to the range of 15°–45° which is set so that the inclinations $\wedge_h$, $\wedge_c$ of the axes $Y_A$, $Y_B$ fall within the range of the positive stall margin, respectively, to securely avoid the danger of the stall of the main stream F. When they deviate from the range, there is a possibility of causing a stall.

Figure 5:
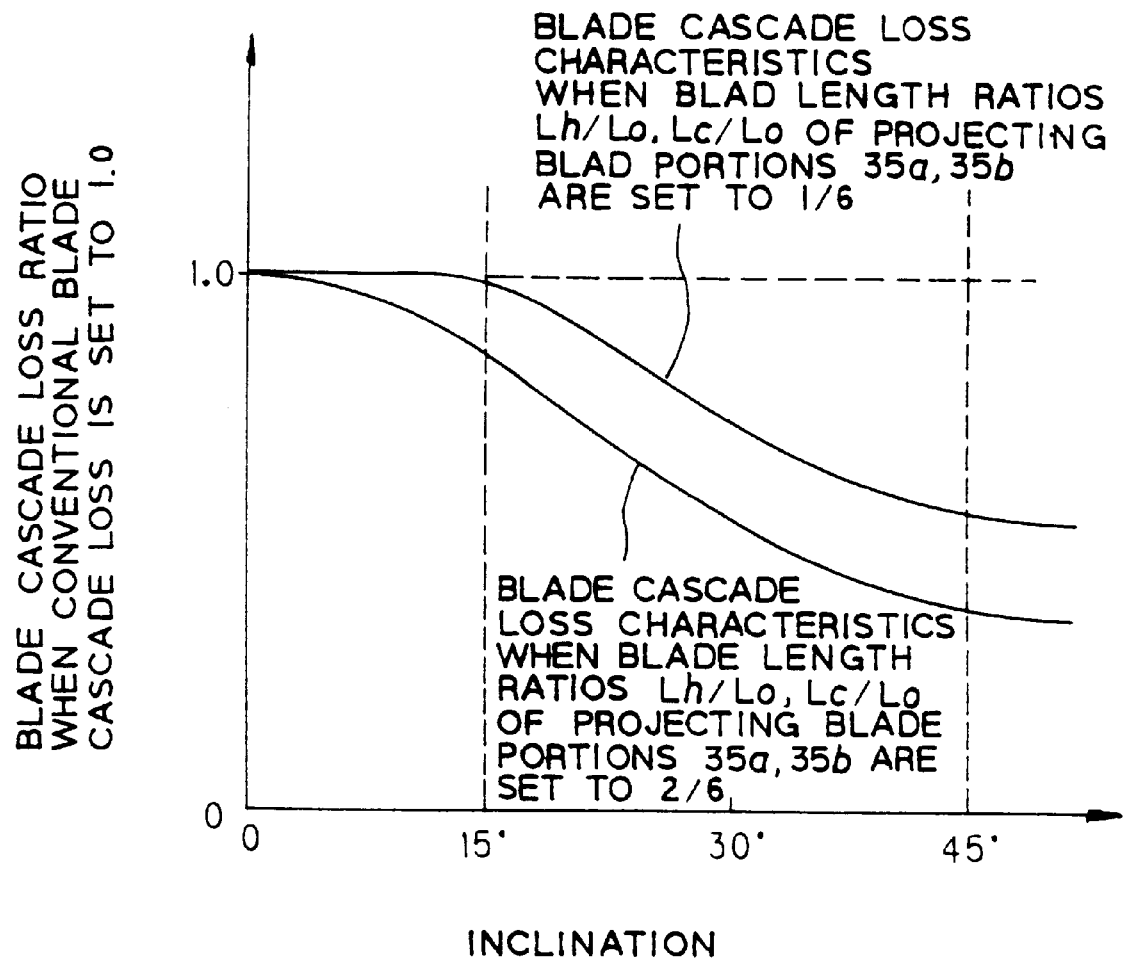
FIG. 5 is a graph showing the blade cascade loss of the blade for the axial fluid machine according to the present invention.

More specifically, when the respective inclinations h, c of the axes $Y_A$, $Y_B$ are set to 15°–45°, the respective blade length ratios $L_n/L_o$, $L_c/L_o$ of the projecting blade portions 35a, 35b are set within the range of the above expression and the conventional blade cascade loss value, which is obtained in no location of the projecting blade portions 35a, 35b, is compared with a reference, it is confirmed by an experiment that the range $\frac{1}{6}$–$\frac{2}{6}$ of the respective blade length ratios $L_n/L_o$, $L_c/L_o$ of the projecting blade portions 35a, 35b are made lower than the conventional comparison reference value 1.0 as shown in FIG. 5 and a favorable result has been obtained.

The first embodiment mentioned above will operate in the following manner.

Figure 3:
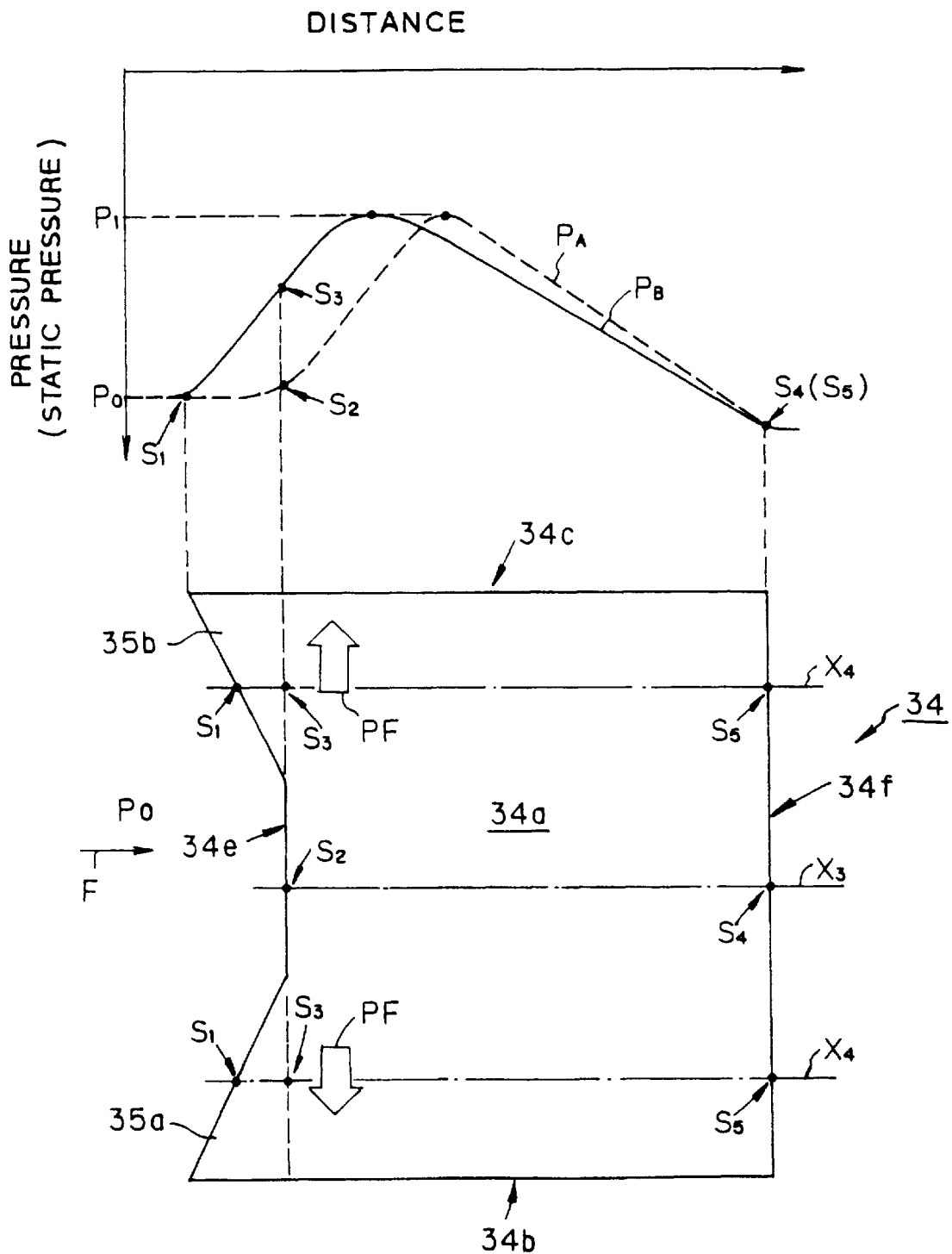
FIG. 3 is a view explaining the blade for the axial fluid machine according to the present invention in relation to the pressure distribution characteristics of a main stream passing through the blade.

When the main stream F flows into the blade cascade at a pressure (static pressure) $P_o$, since the flow passage between the blade cascade is limited, its speed is increased and the pressure $P_o$ is lowered. As a result, as shown by the solid line and the broken line in FIG. 3, the pressure distribution characteristics $P_A$ of the main stream F flowing along the blade lengthwise center line $X_3$ of the effective blade portion 34a and the pressure distribution characteristics PB of the main stream F flowing along the respective blade lengthwise center lines $X_4$, $X_4$ of the projecting blade portions 35a, 35b are such that the pressure of the main stream F is lowered up to a pressure $P_1$ at the blade cascade minimum passage portion and then gradually recovered toward the trailing edge 34f. In this case, since the main stream F first flows to the respective points $S_1$, $S_1$ of the projecting blade portions 35a, 35b and then flows to the point $S_2$ of the effective blade portion 34a, a pressure difference is caused between the point $S_2$ on the line of the leading edge 34e and the points $S_3$, $S_3$, and pressing forces PF are generated by the pressure difference. Since the pressing forces PF act from the blade lengthwise center line $X_3$ of the effective blade portion 34a toward the root portion 34b and the tip portion 34c, they can suppress the convex side horseshoe-shaped swirls 25a, 25b. The pressure of the main stream F passing through the respective blade lengthwise center lines $X_4$, $X_4$ of the projecting blade portions 35a, 35b and the blade lengthwise center line $X_3$ of the effective blade portion 34a is recovered after the pressure of the main stream F reaches the pressure $P_1$ and the pressures of the main stream F which has separately passed through the respective center lines again coincide with each other at the points $S_4$, $S_5$, $S_5$ on the trailing edge 34f.

Figure 17:
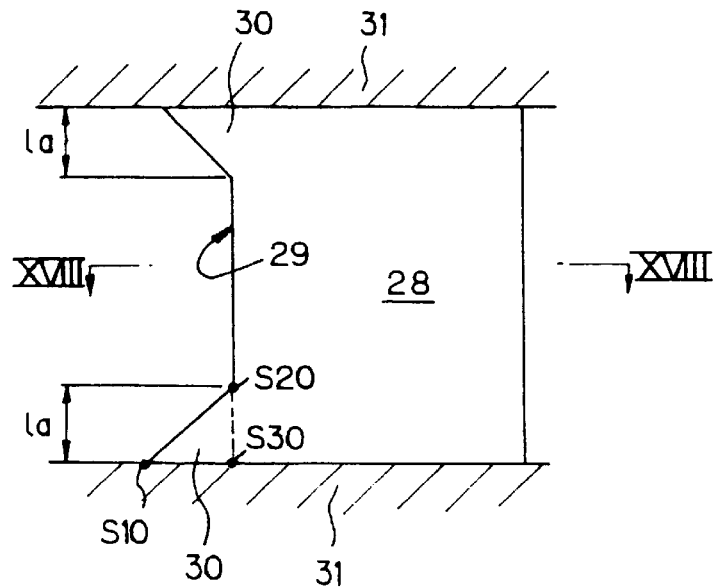
FIG. 17 is a schematic view showing the conventional blades for an axial fluid machine.
Figure 18:
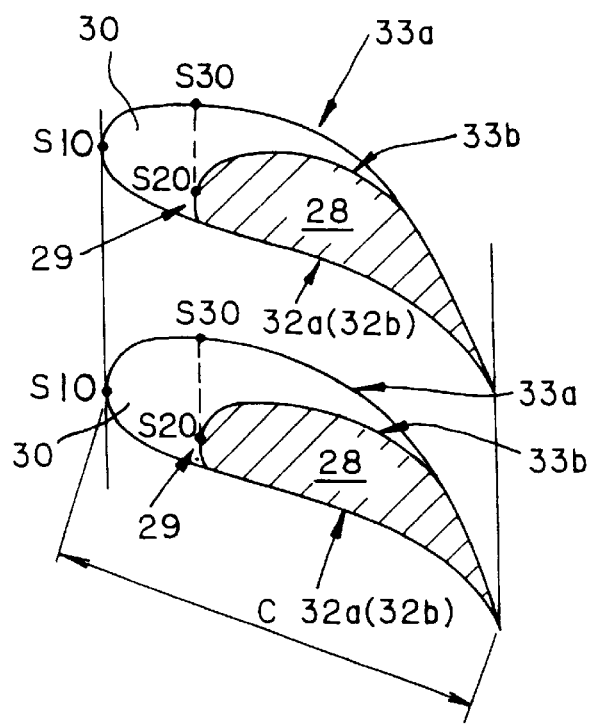
FIG. 18 is a sectional view taken along the line XVIII—XVIII of FIG. 17.
Figure 19:
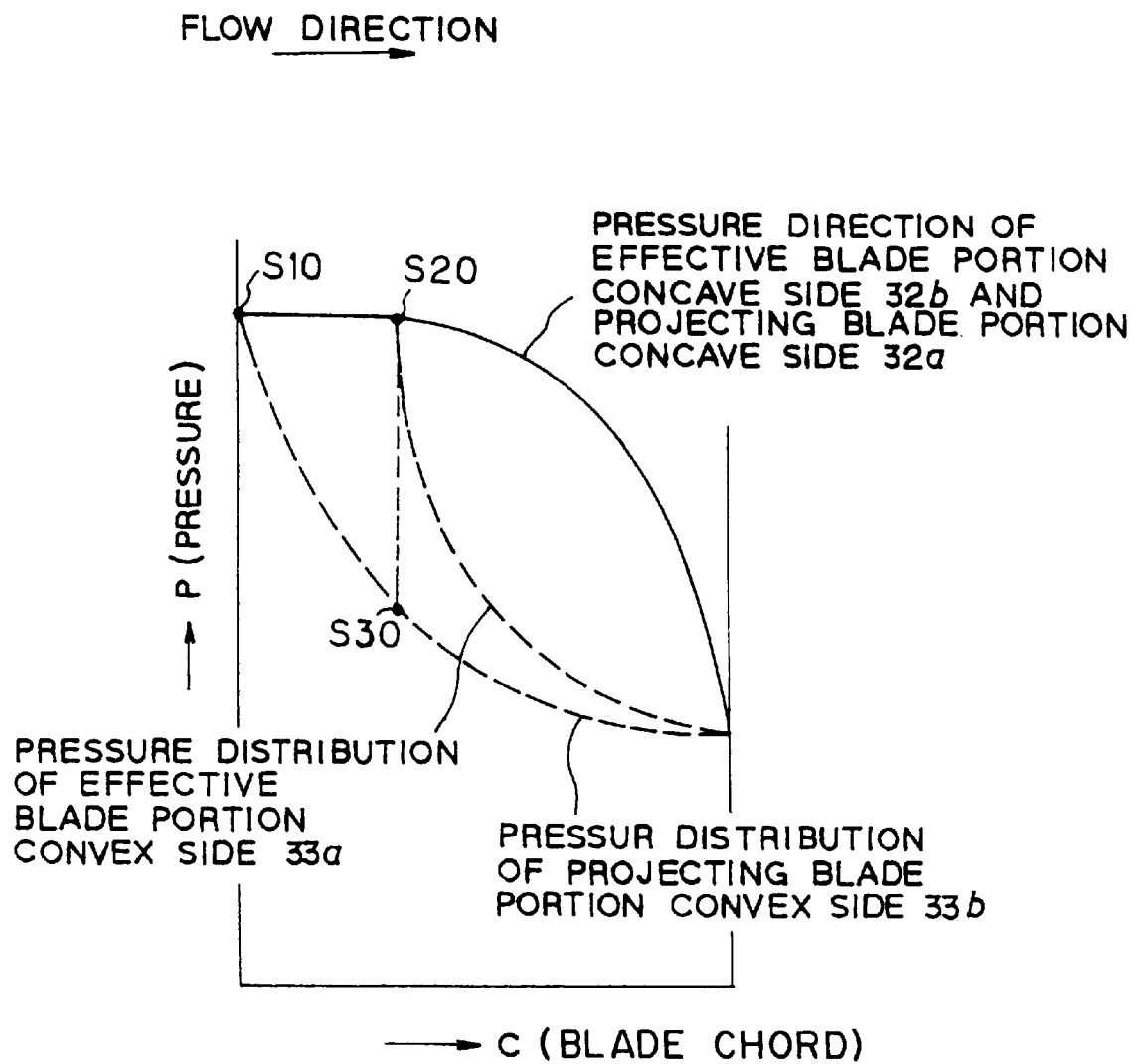
FIG. 19 is a graph showing the pressure distribution of the blade for the axial fluid machine in FIG. 17.

Further, as shown in FIG. 2, the blade of the shown embodiment is formed such that the pressure difference between the concave side of one of the blades and the convex side of the other adjacent blade is set lower than the pressure difference [S10 (S20)–S30] of the prior art shown FIG. 17 by causing the maximum blade thickness $W_2$ of the effective blade portion 34a to coincide with the maximum blade thickness $W_1$ of the respective projecting blade portions 35a, 35b, even if a flow passage swirl, which has been grown from the concave side horseshoe-shaped swirl, flows from the concave side of the one blade toward the convex side of the other blade, it can be suppressed to a low level by the pressing forces PF.

As described above, in the present invention, the reference blade elements 34d are piled along the stagger line $X_2$ and are advanced toward the main stream F side to thereby form the blade 34 including the projecting blade portions 35a, 35b and the effective blade portion 34a, and the pressing forces PF are generated from the center of the effective blade portion 34a toward the root portion 34b and the tip portion 34c. Accordingly, the convex side horseshoe-shaped swirl can be suppressed.

Furthermore, in this embodiment, since the pressure difference between the concave side of the one blade and the convex side of the other adjacent blade is lowered than a conventional pressure difference by causing the maximum blade thickness $W_1$ of the projecting blade portions 35a, 35b to coincide with the maximum blade thickness $W_2$ of the effective blade portion 34a, the flow passage swirl from the concave side of the one blade to the convex side of the other adjacent blade can be suppressed to a low level by the pressing forces PF.

Further, since the inclinations $\Lambda_h$, $\Lambda_c$ of the respective axes $Y_A$, $Y_B$ of the projecting blade portions 35a, 35b and the respective heights $L_n$, $L_c$ of the axes $Y_A$, $Y_B$ thereof are set to the ranges in which the main stream does not stall, even if the flow rate of the main stream F is made relatively small as in the case of a partial load operation, the operation can be safely continued.

Figure 6:
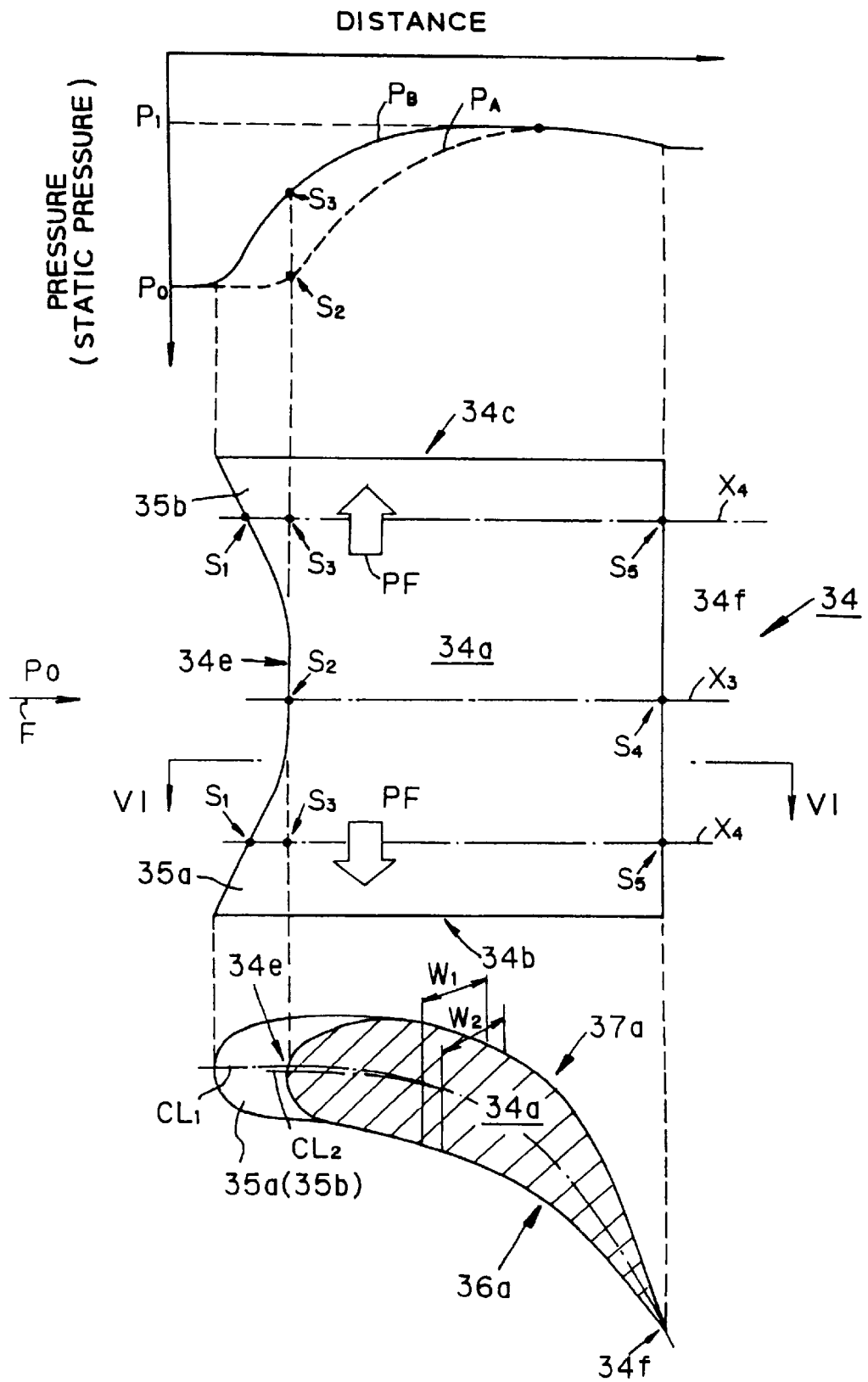
FIG. 6 is a view explaining the relationship among the pressure distribution characteristics, the behavior of the main stream passing through the blade and the lateral sectional shape of the blade (section taken along line VI—VI) when one example of the first embodiment of the blades for the axial fluid machine according to the present invention is shown.

FIG. 6 is a view explaining one example utilizing the first embodiment of the blades for the axial fluid machine according to the present invention.

Although the example shown in FIG. 6 is applied to an axial steam turbine, it is denoted by the same reference numerals as those used in the first embodiment and the description thereof is omitted because the arrangement of the example is substantially the same as that of the first embodiment except that only a blade thickness is different from that of the first embodiment.

Since this example can also generate pressing forces PF from the blade lengthwise center line $X_3$ of an effective blade portion 34a toward a root portion 34b and a tip portion 34c, it can suppress a convex side horseshoe-shaped swirl like the first embodiment.

Further, since this example causes the maximum blade thickness $W_2$ of the effective blade portion 34a to coincide with the maximum blade thickness $W_1$ of the respective projecting blade portions 35a, 35b, it can suppress a flow passage swirl by the pressing forces PF like the first embodiment.

Figure 7:
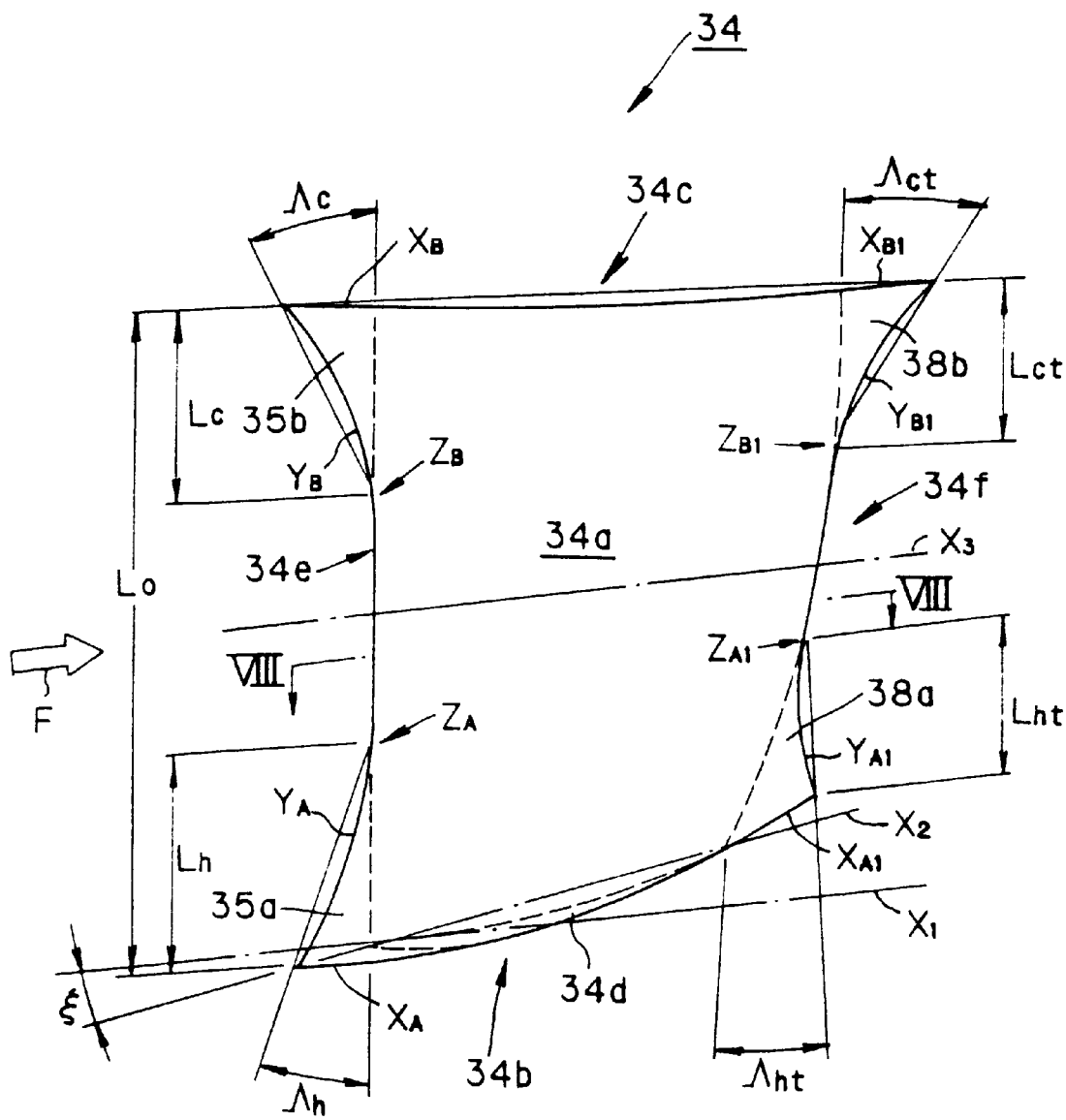
FIG. 7 is a perspective view schematically showing a second embodiment of the blade for the axial fluid machine according to the present invention.

FIG. 7 is a perspective view schematically showing a second embodiment in which the blades for the axial fluid machine according to the present invention is applied to an axial air compressor and an axial steam turbine. Further, it is to be noted that the profile shown in FIG. 7 uses the blade of the axial air compressor as an example. Further, the same components and portions as those of the first embodiment are denoted by the same reference numerals and only different points will be described hereunder.

This example is provided with projecting blade portions 38a, 38b which are formed continuously to the trailing edge 34f of an effective blade portion 34a integrally therewith toward the downstream side of a main stream F, in addition to the projecting blade portions 35a, 35b according to the first embodiment.

The projecting blade portions 38a, 38b are formed by axis reference lines $X_{A1}$, $X_{B1}$ extending from the root portion 34b and the tip portion 34c of the effective blade portion 34a toward the downstream side of the main stream F and axes $Y_{A1}$, $Y_{B1}$ including arc-shaped curved surfaces which are connected from ends of the axis reference lines $X_{A1}$, $X_{B1}$ to the trailing edge 34f of the effective blade portion 34a.

Further, the projecting blade portions 38a, 38b are connected by forming the intersection points $Z_{A1}$, $Z_{B1}$ of the axes $Y_{A1}$, $Y_{B1}$ with the trailing edge 34f of the effective blade portion 34a so as to have a fillet shape.

Figure 8:
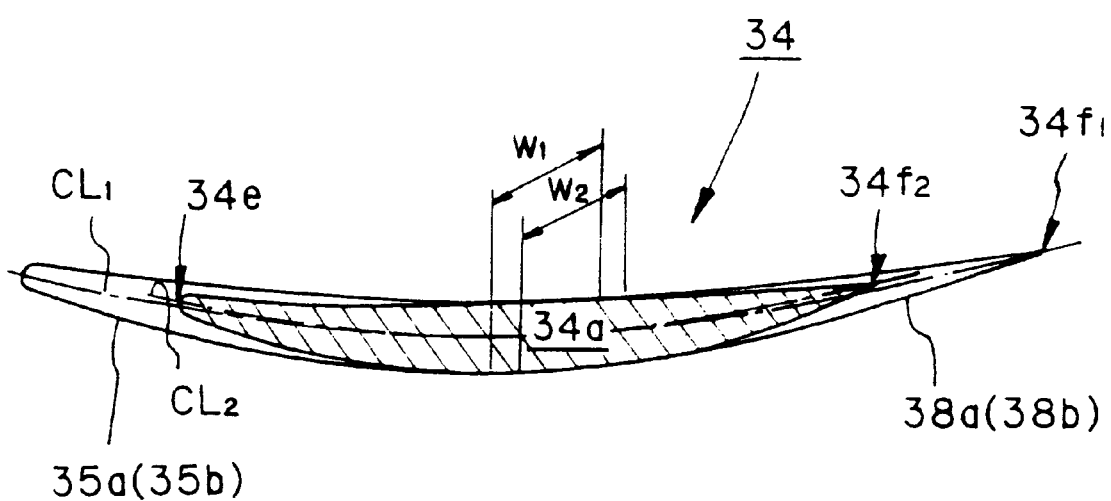
FIG. 8 is a sectional view taken along the line VIII—VIII of FIG. 7.

In addition, as shown in FIG. 8, the lateral (cross) sections of the projecting blade portions 38a, 38b which bulge continuously from the trailing edge 34f of the effective blade portion 34a integrally therewith and the lateral (cross) section of only the effective blade portion 34a are formed such that they coincide with each other at the portion of the maximum blade thickness $W_2$ of, for example, the effective blade portion 34a by displacing the camber lines $CL_1$ of the projecting blade portions 35a, 35b from the camber line $CL_2$ of the effective blade portion 34a for making the inlet angle of the main stream F equal to each of the projecting blade portions 35a, 35b and the effective blade portion 34a. As a result, the camber lines $CL_1$ of the projecting blade portions 35a, 35b and the camber line $CL_2$ of the effective blade portion 34a are displaced as the camber lines $CL_1$ and $CL_2$ advance toward the respective rear edges $34f_1$, $34f_2$.

On the other hand, the axes $Y_{A1}$, $Y_{A2}$ of the projecting blade portions 38a, 38b are formed so as to be displaced by the inclinations ht, ct thereof with respect to the trailing edge 34f of the effective blade portion 34a. Further, the inclined axes $Y_{A1}$, $Y_{B1}$ of the projecting blade portions 38a, 38b are formed so that they have heights $L_{ht}$, $L_{ct}$ with respect to the entire blade length $L_o$ of the effective blade portion 34a, respectively.

Each of the inclinations $\Lambda_{ht}$, $\Lambda_{ct}$ and the heights $L_{ht}$, $L_{ct}$ is set within the range of the following expression.

$$15° \leq \Lambda_{ht}, \Lambda_{ct} \leq 45°$$ [Expression 3]

$$1/6 \leq L_{ht}/L_0, L_{ct}/L_0 \leq 2/6$$

Figure 9:
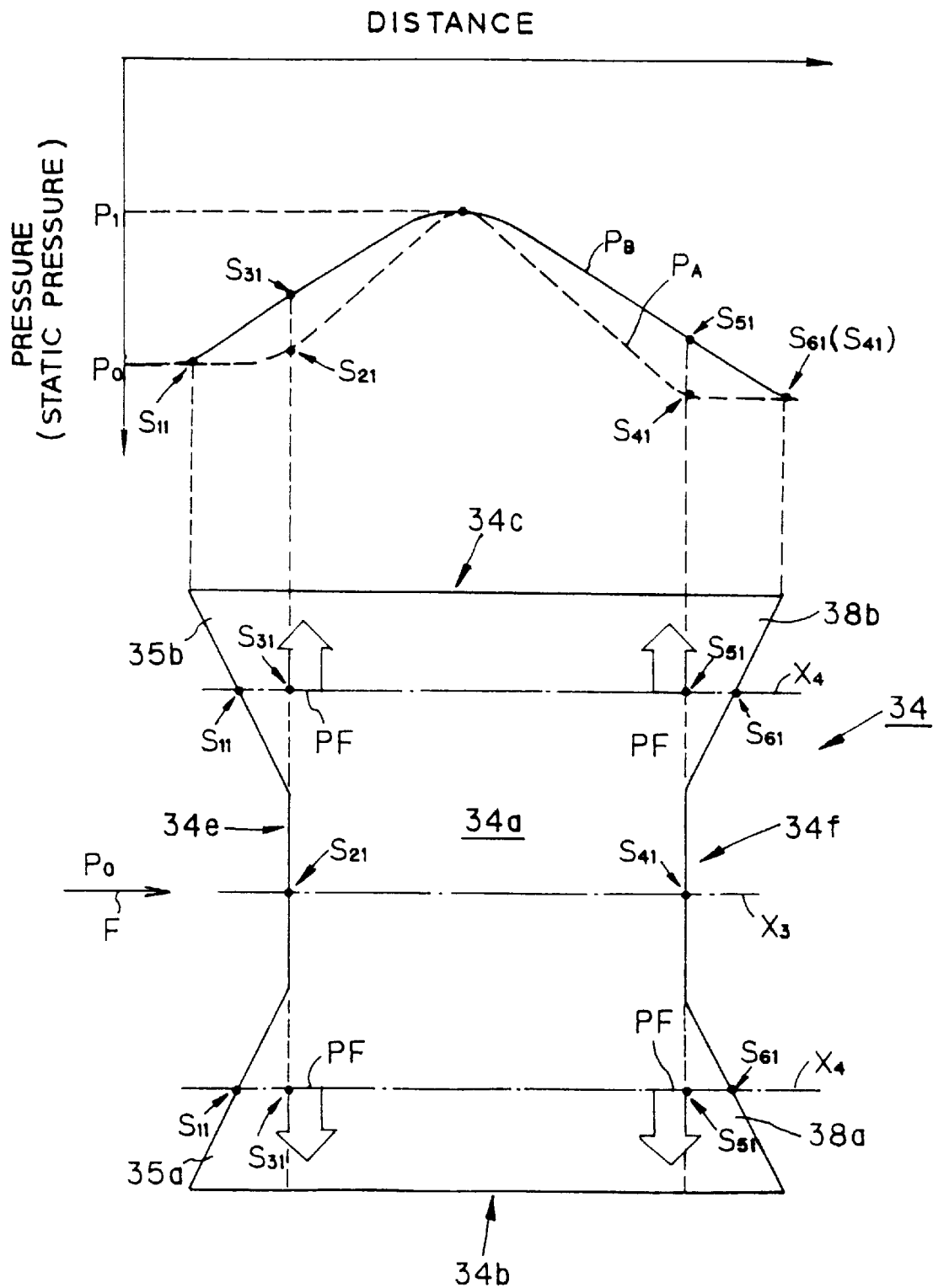
FIG. 9 is a view explaining the blade of the second embodiment of the blades for the axial fluid machine according to the present invention in relation to the pressure distribution characteristics of a main stream passing through the blade.

When each of the inclinations ht, ct and the heights $L_{ht}$, $L_{ct}$ is set within the range of the above expression, the pressure distribution characteristics $P_A$ of the main stream F flowing along the blade lengthwise center line $X_3$ of the effective blade portion 34a are such that the pressure of the main stream F flowing to the point S21 of the effective blade portion 34a at a pressure $P_o$ is lowered to a pressure $P_1$ when the main stream F reaches a blade cascade minimum passage and thereafter the pressure thereof is gradually recovered and made to the former pressure $P_o$ when the main stream F reaches the point S41 of the trailing edge 34f as shown by the broken line in FIG. 9.

On the other hand, the pressure distribution characteristics $P_B$ of the main streams F flowing along the respective blade lengthwise center lines $X_4$, $X_4$ of the projecting blade portions 35a, 35b and 38a, 38b are such that the pressure of the main stream F flowing to the respective points S11, S11 of the projecting blade portions 35a, 35b at the pressure $P_o$ is lowered to the pressure $P_1$ when the main stream F reaches the blade train minimum passage and thereafter the pressure is recovered and added to the former pressure $P_o$ when the main streams F reach the respective projecting blade portions 38a, 38b as shown by the solid line in FIG. 9. In this case, pressure differences are caused between the point S21 and the point S31 and between the point S31 and the point S41 and the points S51, S51, respectively and these pressure differences are applied as pressing forces PF, PF from the center of the effective blade portion 34a to the root portion 34b and the tip portion 34c of the front edge 34f and the root portion 34b and the tip portion 34c of the trailing edge 34f, respectively.

As described above, in the described embodiment, the projecting blade portions 35a, 35b, 38a, 38b are formed to the leading edge 34e side and the trailing edge 34f side, respectively continuous to and integral with the effective blade portion 34a, and the double pressing forces PF, PF are generated from the center of the effective blade portion 34a to the root portion 34b and the tip portion 34c, respectively. Accordingly, a convex side horseshoe-shaped swirl flowing along the convex side of the blades and a flow passage swirl flowing from the concave side of one of the blades to the convex side of the other adjacent blade can be securely suppressed. Further, although the example explains the axial air compressor as an example, it may be also applied to the blade of a steam turbine.

Figure 10:
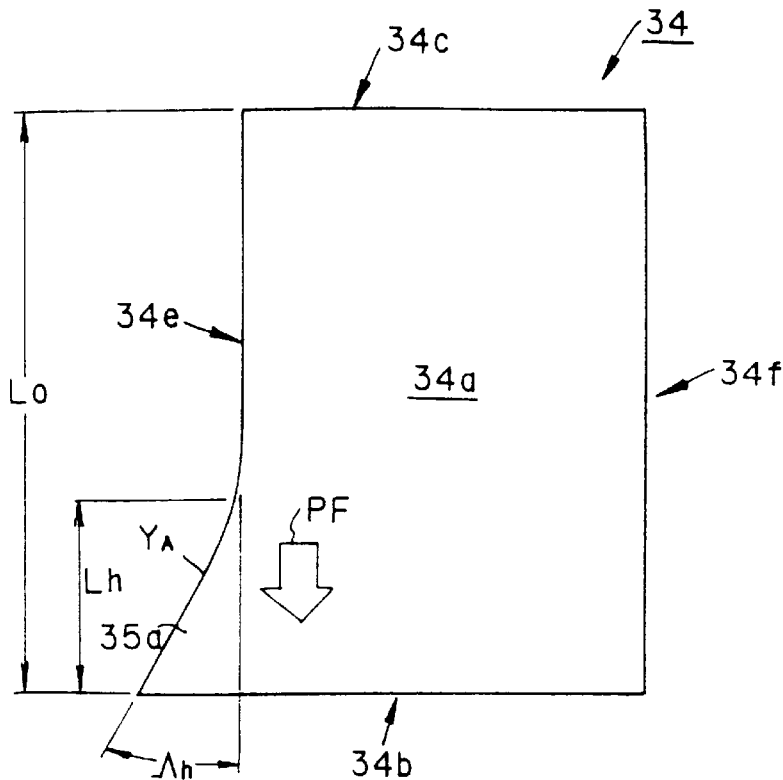
FIG. 10 is a schematic view showing a first example of the second embodiment of the blade for the axial fluid machine according to the present invention.
Figure 11:
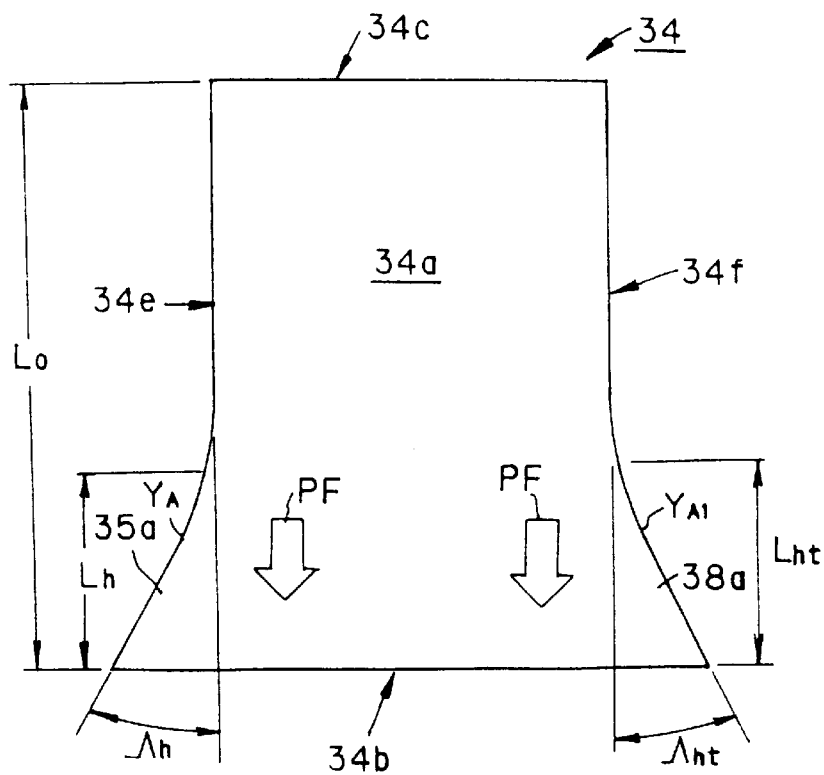
FIG. 11 is a schematic view showing a second example of the second embodiment of the blades for the axial fluid machine according to the present invention.

Further, it is described herein that the projecting blade portions 35a, 35b are formed to the respective root portion 34b and tip portion 34c in the leading edge 34e of the effective blade portion 34a as in the case where the projecting blade portions 38a, 38b are also formed to the respective root portion 34b and tip portion 34c in the trailing edge 34f. However, the present invention is not limited to the above embodiment, and the projecting blade portions 35a may be formed on the root portion 34b side in the leading edge 34e of the effective blade portion 34a as shown in FIG. 10 or the projecting blade portions 35a, 38a may be formed on the root portion 34b side in the leading edge 34e of the effective blade portion 34a and on the root portion 34b in the trailing edge 34f thereof as shown in FIG. 11. In particular, since the pressing forces PF suppress a centrifugal force generated to the blade 34 being rotated, the embodiment can be effectively applied to the moving blade of the axial air compressor and the axial steam turbine.

Figure 12:
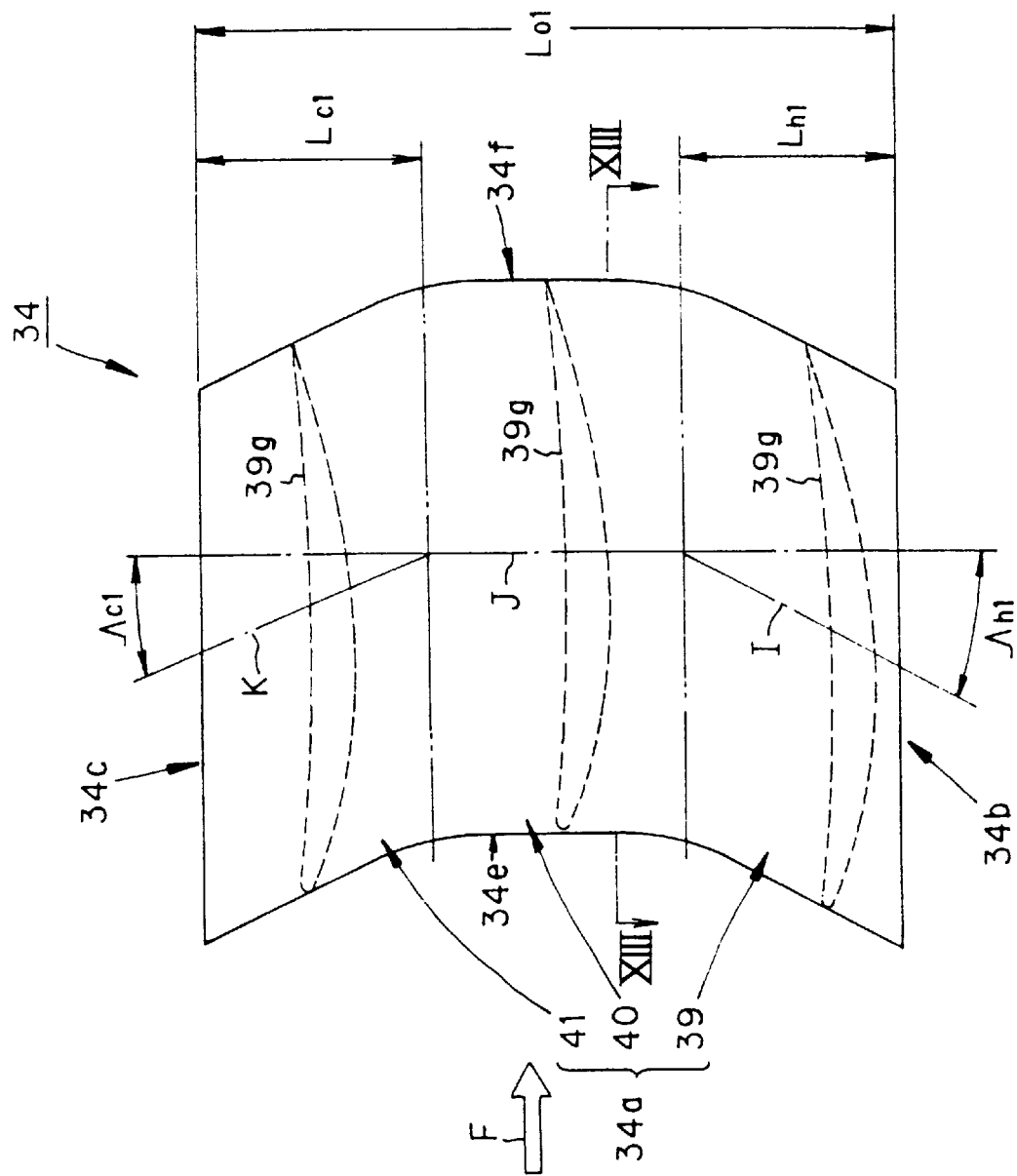
FIG. 12 is a schematic view showing a third embodiment of the blade for the axial fluid machine according to the present invention.

FIG. 12 is a schematic view showing a third embodiment of the blades for the axial fluid machine according to the present invention, in which components and portions similar to those of the first embodiment are denoted by the same reference numerals.

The third embodiment is arranged such that the effective blade portion 34a of a blade 34 is divided into a root blade portion 39, an intermediate blade portion 40 and a tip blade portion 41, and the respective blade portions 39, 40, 41 are formed continuously to and integrally with each other. The respective reference blade elements 39g of the root blade portion 39 and the intermediate blade portion 40 shown by virtual broken lines are advanced from the leading edge 34e of the reference blade elements 39g in the intermediate blade portion 40 shown by the virtual broken line toward a main stream F. In this case, the axis I passing through the center of the lateral (cross) section (inertia main axis) of the root blade portion 39 and the axis K passing through the center of the lateral (cross) section (inertia main axis) of the tip blade portion 41 are formed such that they are displaced by inclinations h1, c1 with respect to the axis J passing through the center of the lateral (cross) section (inertia main axis) of the intermediate blade portion 40. Further, the axis I passing through the center of the lateral section of the root blade portion 39 and the axis K passing through the center of the lateral section of the tip blade portion 41 are formed such that they have heights $L_{h1}$, $L_{c1}$, with respect to the entire blade length $L_{o1}$, of the effective blade portion 34a.

The inclinations $\wedge_h 1$, $\wedge_c 1$ of the axes I, K passing through the centers of the lateral sections are set within the range of the following expression.

$$15° \leq \wedge_{hl}, \wedge_{cl} \leq 45°  \quad \text{[Expression 4]}$$

The range is set sufficiently taking the stall of the main stream F into consideration likewise the first embodiment and when the range is deviated, there is a possibility of causing a stall.

The heights $L_{hi}$, $L_{c1}$ of the axes I, K passing through the centers of the lateral sections are set within the range of the following expression with respect to the entire blade length $L_{o1}$ of the effective blade portion 34a.

$$1/6 = L_{hl}/L_{o1}, L_{c1}/L_{o1} \geq 2/6 \quad \text{[Expression 5]}$$

The expression is set in relation to the range of 15°–45° set so that the respective inclinations $\wedge_h 1$, $\wedge_c 1$ of the axes I, K passing through the centers of the lateral sections are in the range of a positive stall margin in order to securely avoid the danger of a stall of the main stream F.

Figure 13:
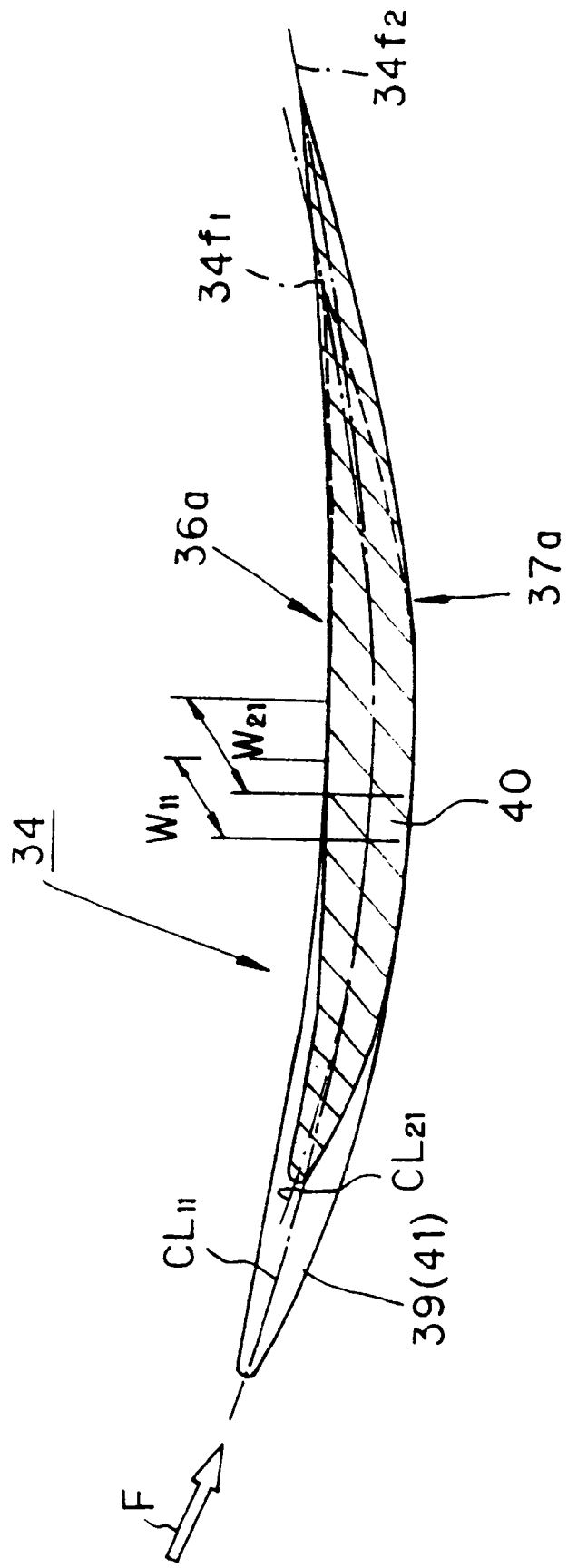
FIG. 13 is a sectional view taken along the line XIII—XIII of FIG. 12.
Figure 14:
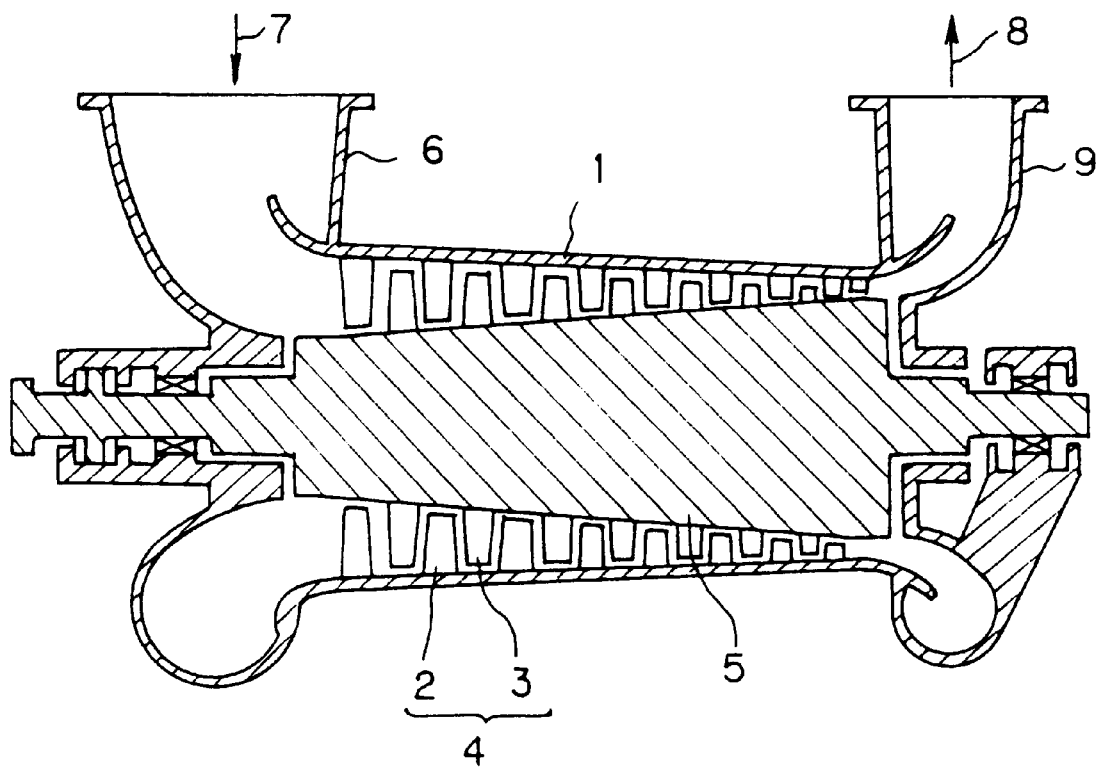
FIG. 14 is a schematic sectional view of a conventional axial air compressor.
Figure 15:
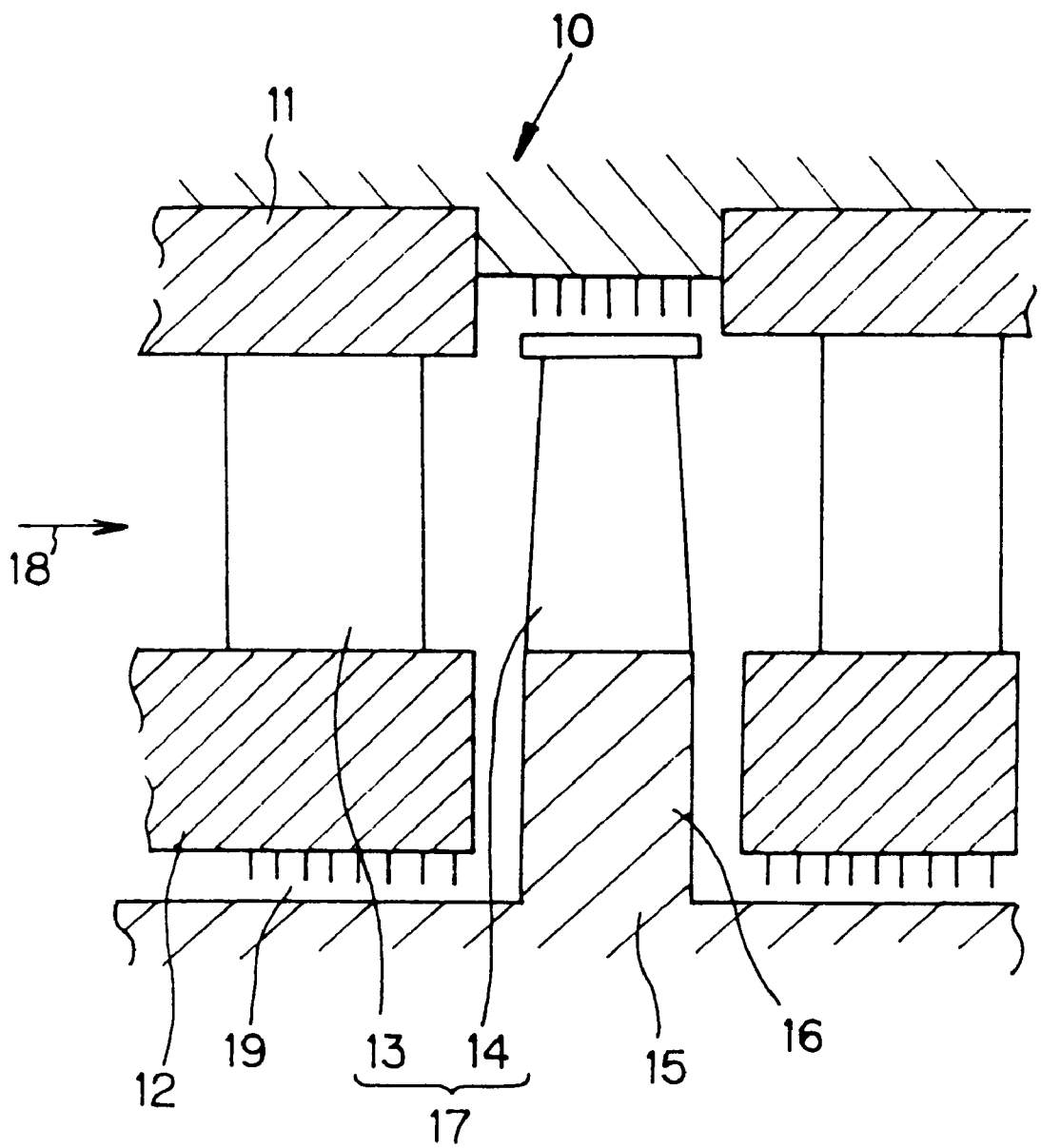
FIG. 15 is a schematic partial sectional view of a conventional axial stream turbine.
Figure 16:
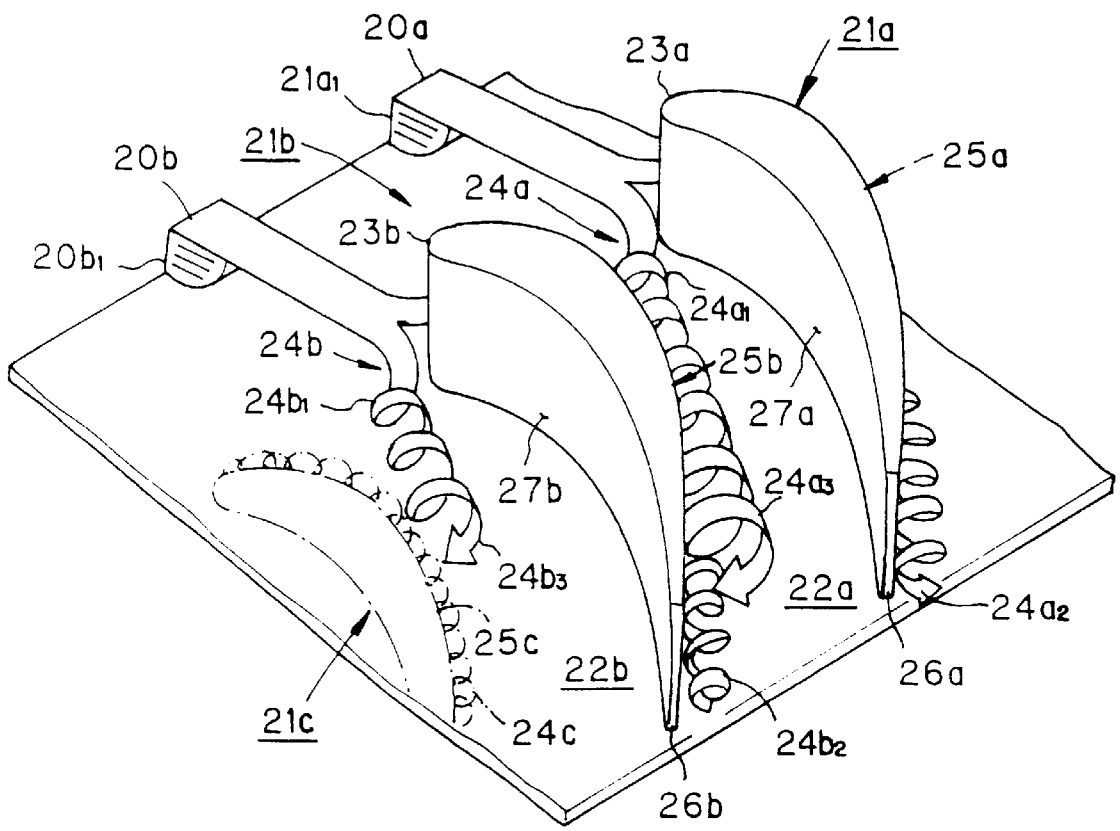
FIG. 16 is view explaining the mechanism for generating a swirl and the behavior of the swirl in a conventional blade cascade.

On the other hand, as shown in FIG. 13, the lateral sections of the root blade portion 39 and the tip blade portion 41, which continuously bulge from the leading edge 34e of the intermediate blade portion 40, and the lateral section of only the intermediate blade portion 40 are formed such that they coincide with each other at the portion of the maximum blade thickness $W_{21}$ of, for example, the intermediate blade portion 40 by displacing the camber lines $CL_{11}$ of the root blade portion 39 and the tip blade portion 41 from the camber line $CL_{21}$ of the intermediate blade portion 40 for making the flow angle of the main stream F equal to each of the root blade portion 39, the tip blade portion 41 and the intermediate blade portion 40.

As described above, in the third embodiment, since the effective blade portion 34a is divided into the root blade portion 39, the intermediate blade portion 40 and the tip blade portion 41 and since the root blade portion 39 and the tip blade portion 41 are advanced from the leading edge 34e of the intermediate blade portion 40 toward the main stream F, pressing forces PF can be generated from the intermediate blade portion 40 toward the root portion 34b of the root blade portion 49 and the tip portion 34c of the tip blade portion 41 like in the first embodiment.

Therefore, in the described embodiment, since the pressing forces PF can be generated from the intermediate blade portion 40 toward the root portion 34b of the root blade portion 39 and the tip portion 34c of the tip blade portion 41, respectively, a convex side horseshoe-shaped swirl and a flow passage swirl can be suppressed. In the embodiment, since the pressing forces PF are more greatly generated at the position where a boundary layer is exfoliated by the convex side horseshoe-shaped swirl, the embodiment can be effectively applied to the stationary blade and the moving blade of an axial air compressor.

What is claimed is:

1. A blade for an axial fluid machine, comprising an effective blade portion having a root portion, a tip portion and projecting blade portions, wherein said projecting blade portions are defined by axis reference lines extending to an upstream side with respect to a fluid flow from at least one of the root portion and the tip portion of the effective blade portion and axes obliquely extending from ends of the axis reference lines toward a leading edge of the effective blade portion and said projecting blade portions are formed continuously and integrally with the leading edge of the effective blade portion, wherein either of said projecting blade portions extend along the obliquely extending axes to the points of intersection between either of the blade tip or root said axes obliquely extending toward the leading edge of the effective blade portion having an inclination in a range of 15° to 45° with respect to the leading edge of the effective blade portion and said axes obliquely extending toward the leading edge of the effective blade portion having a height in a range of $\frac{1}{6}$–$\frac{2}{6}$ with respect to an entire blade length of the effective blade portion.

2. A blade for an axial fluid machine according to claim 1, wherein said projecting blade portions are formed continuously and integrally with the leading edge of the effective blade portion so that said effective blade portion and said projecting blade portions have substantially the same maximum blade thickness.

3. A blade for an axial fluid machine, comprising an effective blade portion having a root portion and a tip portion and projecting blade portions including first and second groups thereof in arrangement, wherein the first group of said projecting blade portions includes projecting blade portions defined by first axis reference lines extending to an upstream side with respect to a fluid flow from at least one of the root portion and the tip portion of the effective blade portion and first axes obliquely extending from ends of the first axis reference lines toward a leading edge of the effective blade portion, said projection blade portions of the first group being formed continuously and integrally with the leading edge of the effective blade portion, and the second group of said projecting blade portions includes projecting blade portions defined by second axis reference lines extending to a downstream side with respect to a fluid flow from at least one of the root portion and the tip portion of the effective blade portion and second axes obliquely extending from ends of the second axis reference lines toward a trailing edge of the effective blade portion, wherein said first group of projecting blade portions extend along the first axes extending obliquely toward the leading edge to the points of intersection between said first axes extending obliquely toward the leading edge and either of the blade tip or root portions; and wherein said second group of project blade portions extend along the second axes extending obliquely toward the trailing edge to the points of intersection between said second axes extending obliquely toward the trailing edge and either of the blade tip or root portions, said projecting blade portions of the second group being formed continuously and integrally with the trailing edge of the effective blade portion, said axes obliquely extending toward the trailing edge of the effective blade portion having an inclination in a range of 15° to 45° with respect to the trailing edge of the effective blade portion, and said axes obliquely extending toward the trailing edge of the effective blade portion having a height in a range of $\frac{1}{6}$–$\frac{2}{6}$ with respect to an entire blade length of the effective blade portion.

4. A blade for an axial fluid machine according to claim 3, wherein said effective blade portion and said projecting blade portions of first and second groups have substantially the same maximum blade thickness.

5. A blade for an axial fluid machine including an effective blade portion, wherein said effective blade portion is divided into a root blade portion, an intermediate blade portion and a tip blade portion which are formed continuously and integrally with each other and wherein an axis passing through a center of cross section of the root blade portion and an axis passing through a center of cross section of the tip blade portion are obliquely formed toward an upstream side with respect to an axis passing through a center of cross section of the intermediate blade portion and said root blade portion, wherein a leading edge of said root blade portion extends parallel to the obliquely formed axis passing through a center of cross section of the root blade portion to the point where the blade root and leading edge intersect; and wherein a leading edge of said tip blade portion extends parallel to the obliquely formed axis passing through a center of cross section of the tip blade portion to the point where the blade tip and leading edge intersect, said axis passing through the center of cross section of the root blade portion and said axis passing through the center of a cross section of the tip blade portion having inclinations in a range of 15° to 45° with respect to said axis passing through the center of the cross section of the intermediate blade portion, and a height of said axis passing through the center of the cross section of the root blade portion and a height of said axis passing through the center of the cross section of the tip blade portion being set respectively to a range of $\frac{1}{6}$–$\frac{2}{6}$ with respect to an entire blade length of the effective blade portion.

6. A blade for an axial fluid machine according to claim 5, wherein said root blade portion and said tip portion have a maximum blade thickness substantially the same as that of said intermediate blade portion.

\* \* \* \* \*